(No Model.)
C. GORDON.
APPARATUS FOR COOLING AND DRAWING BEER.
No. 248,646. Patented Oct. 25, 1881.
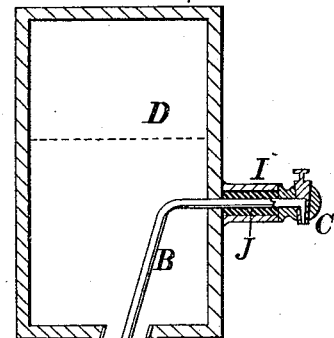
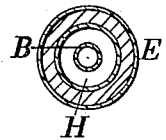
Fig. 2.
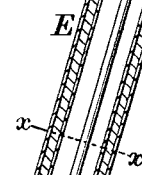
Fig. 1.
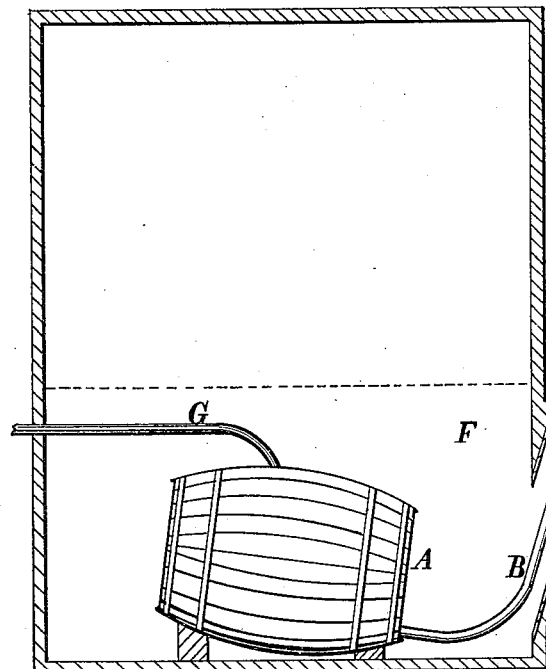
WITNESSES =
H.G. Phillips.
W.H. Walker.
INVENTOR =
Charles Gordon,
by Geo. B. Selden,
Atty.

United States Patent Office.

CHARLES GORDON, OF ROCHESTER, NEW YORK.

APPARATUS FOR COOLING AND DRAWING BEER.

SPECIFICATION forming part of Letters Patent No. 248,646, dated October 25, 1881.

Application filed April 23, 1881. (No model.)

*To all whom it may concern:*

Be it known that I, CHARLES GORDON, of Rochester, Monroe county, New York, have invented an Improved Apparatus for Drawing and Cooling Beer, Ale, &c., of which the following is a specification, reference being had to the annexed drawings.

My invention relates to an improved apparatus having for its object the keeping of beer, ale, or other liquid at a low temperature during the operation of drawing the same for consumption; and it consists in surrounding the supply-plate through which the beer is delivered to the faucet with a cold-air passage, for the purpose of maintaining a low temperature in the liquid in the supply-pipe.

My invention also consists in surrounding the cold-air passage and the faucet with a non-conducting jacket, and in the combination, with the ice-box and the lower chamber for storing the beer, of the supply-pipe and the cold-air passage communicating between the ice-box and chamber, as hereinafter more fully set forth.

My improved apparatus for drawing and cooling beer is represented in the accompanying drawings, in which—

Figure 1 is a sectional elevation of the same. Fig. 2 is a section through the supply-pipe and cool-air jacket on the line *x x*, Fig. 1.

In the accompanying drawings, representing my improved apparatus, A is the keg containing ale, beer, or other liquid; B, the supply-pipe; C, the faucet from which the liquid is drawn for consumption; D, the ice-box; E, the non-conducting jacket surrounding the supply-pipe; F, the lower chamber to receive the kegs, and G the pipe connected with the air-forcing apparatus.

The chamber or box F, in which the beer is stored, may be of any preferred material or size, and provided with suitable racks to support the kegs. Suitable doors should be made in the chamber for the introduction and removal of the kegs, and the walls of the chamber are preferably made non-conductors of heat, in any usual way. The chamber is located in the cellar or lower portion of the building in which the beer is drawn, the latter being forced upward by the pressure of air introduced into the kegs from any suitable air-compressing apparatus through the pipe G.

The supply-pipe B, through which the beer is conveyed to the faucet, is attached to the keg at its lower end by any suitable coupling. The supply-pipe passes upward through a cool-air passage, H, which is surrounded by a non-conducting jacket, which prevents the absorption of heat by the cool air in the passage. The air-passage H communicates at its upper end with the ice-box D, and at its lower end with the chamber F, so that the air cooled by the ice in the box flows or circulates through the passage H, thereby reducing the temperature of the beer in the supply-pipe. The water produced by the melting of the ice in the ice-box will also flow downward through the air-passage, assisting in the cooling operation.

The ice-box may be of any preferred material or form, and, as it is designed to be placed on or behind the counter, it may be ornamented on its exterior in any preferred way. A perforated shelf may be placed in the ice-box to support the ice, as represented by the dotted line in Fig. 1.

That portion of the faucet which projects beyond the ice-box is surrounded by a pipe or tube, I, the space between it and the faucet being filled with resin or other suitable non-conducting substance, to prevent the beer in the faucet-pipe from being heated by the surrounding atmosphere.

The non-conducting jacket E, surrounding the supply-pipe B, may be made in any suitable way. A convenient mode of constructing the jacket is by the use of two pipes of different diameters, one within the other, the space between them being filled with resin or other suitable non-conducting material.

The supply-pipe B may run vertically or at any preferred angle, and through one or more stories of the building in which the apparatus is used.

The chamber F may be arranged for the reception of ice by placing perforated shelves therein.

Any usual form of faucet may be used in connection with my improved apparatus.

The ice-box may be constructed in any ordinary way to prevent the melting of the ice by the absorption of heat from the surrounding atmosphere.

It is obvious that two or more supply-pipes, each provided with a separate faucet, may be placed within the cold-air passage H.

I claim—

1. The combination of the ice-box D, supply-pipe B, faucet C, and the cold-air passage H, surrounding the supply-pipe, substantially as and for the purposes set forth.

2. The combination, with the ice-box D, of the supply-pipe B and faucet C, provided with the non-conducting jacket J, substantially as and for the purposes set forth.

3. The combination, with the ice-box D, supply-pipe B, and faucet C, of the cold-air passage H and the non-conducting jacket E, substantially as and for the purposes set forth.

4. The combination of the ice-box D, supply-pipe B, faucet C, lower chamber, F, and the cold-air passage H, communicating between the ice-box and the chamber, substantially as described.

CHAS. GORDON.

Witnesses:
GEO. H. HUMPHREY,
JOHN A. BERNHARD.